INVENTORS:
Seymour Meyerson
Henry M. Grubb

United States Patent Office 2,890,336
Patented June 9, 1959

2,890,336
ADJUSTABLE FEEDBACK SYSTEM

Seymour Meyerson, Gary, and Henry M. Grubb, Highland, Ind., assignors to Standard Oil Company, Chicago, Ill., a corporation of Indiana Application December 31, 1953, Serial No. 401,516

4 Claims. (Cl. 250—41.9)

The invention relates to an improvement in the production and recording of signals from measuring instruments. More specifically, the invention relates to an improved method and means for modifying the output of an amplifier for a given input employed with signal-producing apparatus.

Heretofore, it has been customary to make arithmetical corrections of data in an effort to compensate for instrumental drift and for variations in conditions of tests, such as differences in temperature and pressure. However, such prior methods have necessarily entailed many subsequent calculations. The time necessary for clerks to make these calculations is considerable and, in many cases, the delay in the issuing of results on routine analyses by mass spectrometers is due to the back-log of calculations to be made by the clerks and not the instrument itself. Accordingly, it is a primary object of this invention to provide a novel method and means for automatically compensating for signal variables which are due to instrument drift, changes in test pressure, variations in temperature, or the like. A further object is to provide an apparatus which is of simple and rugged construction and which may be operated in conjunction with the primary instrument.

For example, there is considerable interest in various techniques for automatic calculation of data from measure and control instruments. In order to facilitate mechanization of these computations, it is desirable to reduce to a minimum the number of variables that must be considered. It is, therefore, an object of our invention to provide a ready means of compensating electrically for variables in such computations.

A more specific object of our invention is to provide a method and means for adjustment of sensitivity drift in a mass spectrometer ionization chamber. An additional object is to provide a method and means for adjusting for the pressure at which the gas sample is tested in a mass spectrometer. Still another object of the invention is to provide an apparatus for modifying the gain of an amplifier system with respect to such variables as drift and sample pressure. An additional object of this invention is to provide a system for compensating for differences in the measuring and recording system due to changing the ion chamber and changing the leak unit. A further object is to provide a system which requires a minimum of modification of conventional amplifier systems. These and other objects of our invention will become apparent to those skilled in the art as the description thereof proceeds.

A mass spectrometer is an example of an analytical apparatus to which our invention may be applied. It ordinarily includes an ionization chamber wherein molecules of the sample to be analyzed are converted into ions by bombardment by a stream of electrons. These electrons are propelled into and through the sample by so-called propelling or accellerating electrodes. The ions are separated into a plurality of diverging beams of ions by subjecting them to a transverse electrical or magnetic field or both during passage through the analyzer chamber. Each beam, so produced, is composed of ions of the same mass to charge ratio and differing from the ions in the other beams. The diverging beams are successively focused and discharged on an ion collector. The current produced by each beam is indicative of the amount of ions in each beam and is thus a measure of partial pressure of the molecules, from which the ions were derived, in the sample analyzed.

The mass spectrometer is provided with a pressure measuring means which may be an Hg manometer or an electrical pressure measuring means. In the first case, the gas samples are metered at about 35 mm. Hg. The sample is then expanded into about a two-liter volume, the sample pressure dropping to about 50 microns at which point the pressure is measured if the electrical pressure measuring means is employed. From this volume, the sample is admitted through a leak unit (frequently comprising a gold leaf orifice plate) to the ionization chamber.

With reasonable care on the part of the operator, the pressure at which the sample is metered may be kept within a selected range and the actual manometer reading recorded and subsequently employed in applying a correction factor to make the observed equivalent to operation at an arbitral standard sample pressure.

In a representative manometer system for measuring pressure, the instrument has a volume at 0 mm. sample pressure of about 3.71 ml.; the bulb has an I.D. of 2.2 cm.; and the capillary an I.D. of 0.306 cm. The pressure readings on a manometer of such dimensions can be corrected for PV effects by use of a derived expression which makes the correction equal to 0 at a reading of 35 mm. Hg or at any other arbitrarily selected pressure. When $P^1$ is the scale reading and P is the corrected pressure, both $P^1$ and P being expressed in mm. Hg, the corrected pressure $P$=observed pressure $P^1$ (correction factor). In the manometer described above, the correction factor is $(.9352+.001853P^1)$.

We have devised systems for varying the amplifier gain, by varying the feedback to the amplifier, in such a way as to compensate for the difference between the actual sample pressure and an arbitrary standard pressure such as 35.0 mm. Hg.

Another of the problems involved in such a system is obtaining sufficient stability such that the instrument, once calibrated, will retain its calibration with sufficient accuracy for a practicable period of time. Our present invention resides in a means for electrically maintaining the instrument on calibration and for avoiding the calculations heretofore necessary by introducing or modifying an electrical characteristic in the system corresponding to slow sensitivity drifts and to changes in sample pressure.

Further details and advantages of our improvement will be described in connection with the accompanying drawings wherein.

Figure 1:
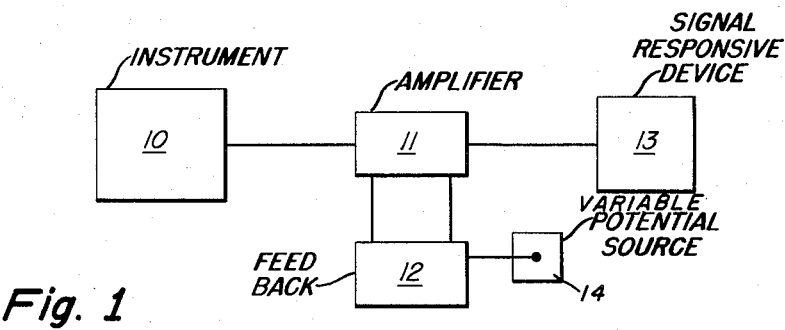
Figure 1 is a schematic representation of an over-all system embodying our improved compensating assembly.

Referring to the drawings, we have incorporated our improved compensating assembly 12 in the amplifier 11, which may be associated with a mass spectrometer or other signal-producing apparatus 10 as shown in Figure 1. The compensated output signal from the amplifier 11 is fed to a signal-responsive device 13 which may be a meter, recorder, computer, or the like. We prefer to employ a sufficiently high degenerative feedback to the amplifier 11 so that the gain of the amplifier 11 is inversely proportional to the amount of the degenerative feedback.

The construction of the signal-producing instrument 10 and the construction of the amplifier 11, except for the improvement described below, are well known and will not be described in further detail. However, for discussion of the necessary conditions see Valley and Wallman, "Vacuum Tube Amplifiers," McGraw-Hill Book Company, Inc., 1948, chapter 11. Our improvement modifies this inverse relationship to readily change the amplifier gain by a precisely known manner and in accordance with selected and determinable variables.

Figure 2:
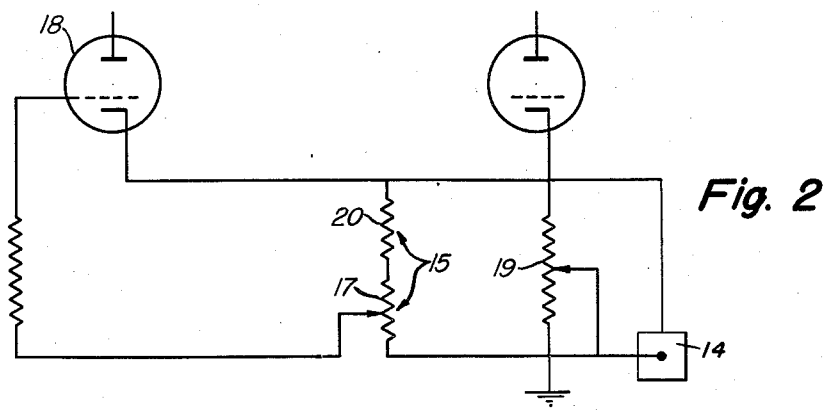
Figure 2 is a circuit diagram illustrating one form of the compensating assembly.
Figure 3:
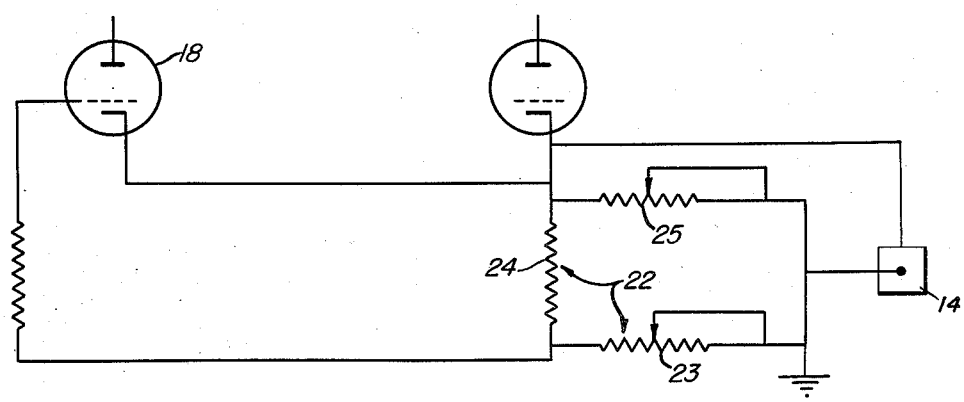
Figure 3 illustrates another embodiment of such assembly employed in the system of Figure 1.

Amplifiers employing high negative or degenerative feedback are in widespread use in electronic instruments for measurement and control. We provide variable feedback elements as shown in Figures 2 and 3 by means of which the amplifier gain can be conveniently adjusted. In particular, this apparatus and technique makes possible the adjustment of the amplifier gain to compensate for drift of other components in the system of Figure 1 so as to maintain over-all instrument sensitivity at a preselected value.

Referring to Figure 1, the signal from the instrument 10, which is fed to the amplifier 11, is subject to certain variables. For example, when the signal is transmitted from an ion collector in a mass spectrometer, such signal will vary depending upon the characteristics and conditions of the ionization chamber and leak. Also, the signal, being proportional to the partial pressure of the sample constituents, is accordingly subject to variations in the total pressure of the sample.

The amplifier 11, to which such signal is supplied, conventionally comprises a plurality of stages of amplification including an input tube, intermediate stages of amplification, an output tube, and a feedback resistor. The voltage developed across the feedback resistor by the flow of plate current in the output tube is fed back to the input tube. As long as the numerical product of the forward gain and percentage feedback is materially greater than one, then the inverse relationship described above holds and the gain of the amplifier 11 will be inversely proportional to the feedback resistance. Such a system is adaptable to the compensation for variables occurring outside of the amplifier 11.

In Figure 2, we have illustrated an embodiment of the invention which includes a voltage divider 15 illustrated as comprising a 60,000 ohm potentiometer 17 and a 953,000 ohm fixed resistor 20 whose function is to feed back to tube 18 a portion of the voltage developed across the 6,000 ohm variable feedback resistor 19. If the position of the slide on variable resistor 17 (or reading of an associated dial) is to be in a substantially linear relationship to the portion of the total voltage across feedback resistor 19, then the combined value of variable resistor 17 and resistor 20 must be larger than 19 by a factor sufficiently large that its shunting effect across variable resistor 19 is negligible for most applications.

The control of the variable resistor 17 permits us to compensate for variations in the total pressure on the sample in a mass spectrometer 10. The adjustment of variable resistor 19, on the other hand, permits our compensating for drift associated with other components of the system. Although this array is preferred, it should be understood that either resistor may be used to compensate for either variable by suitable changes in their values.

Accordingly, in a typical operation we may adjust 19 with a calibrating sample to make the over-all compensation for such drifts once for a series of tests and then may make the adjustment of 17 to compensate for variations in pressure on each sample test. It should be understood, however, that corresponding adjustments of 19 and 17 may be made for other variables when the improvement is applied to amplifiers receiving signals from other than ion collectors of mass spectrometers.

Another illustration of our improvement will be found in Figure 3 wherein we have illustrated a preferred embodiment of the compensating assembly 12 where the signal-generating instrument 10 is a mass spectrometer. In this embodiment, the voltage divider 22 comprises a 300,000 ohm rheostat 23 and an 836,000 ohm fixed resistor 24. A dial on the variable rheostat 23 may be calibrated to read pressure directly over the range of 30 to 40 mm. Hg. The voltage divider network 22 comprises the 836,000 ohm fixed resistor 24 and the 300,000 ohm rheostat 23 connected so as to have a non-linearity which almost exactly compensates for errors in manometer readings resulting from PV effects.

The 6,000 ohm potentiometer 25 functions as described in connection with Figure 2. A dial mounted on this potentiometer 25 may be calibrated to facilitate setting the feedback resistance to obtain the desired change in gain.

Potentiometer 25 in Figure 3 permits altering of the amplifier gain on the basis of a correction factor computed from a check calibration, the frequency of such calibration being determined by the degree of sensitivity drift. This factor maintains over-all sensitivity at a constant preselected value and precludes the necessity of making a mathematical correction which heretofore was made to all the analytical results obtained between check calibrations.

In either arrangement of Figure 2 or Figure 3, if potentiometer 19 or 25 is a linear potentiometer the inverse relationship of feedback and gain will result in a non-linear correction. In order to correct for the non-linearity of the gain adjustment and for the PV error in the manometer reading, we may employ a non-linear potentiometer or a non-linear scale on the dial used to set the potentiometer 25 or 19.

The circuits of Figures 2 and 3 with linear potentiometers and dials having linear markings may be used to correct for sample pressures over the range of 34.0 to 36.0 mm. Hg. It should be noted that the following tables of corrections particularly apply to the representative manometer described in column 2, lines 33–45. Similar tables of corrections for a manometer of different dimensions could be prepared, but optimum resistor values would have to be redetermined.

In Table I below, $P^1$=manometer reading, $P$=corrected pressure, $D^1$=dial setting=$P^1$, and $D$=corrected dial setting. For optimum operation, $D$ should equal $P$.

*Table I*

| $P^1 = D^1$ | $P$ | D | |
|---|---|---|---|
| | | Fig. 2 | Fig. 3 |
| 34.0 | 33.94 | 33.96 | 33.93 |
| 34.2 | 34.15 | 34.17 | 34.15 |
| 34.4 | 34.36 | 34.37 | 34.36 |
| 34.6 | 34.58 | 34.58 | 34.57 |
| 34.8 | 34.79 | 34.79 | 34.79 |
| 35.0 | 35.00 | 35.00 | 35.00 |
| 35.2 | 35.22 | 35.21 | 35.21 |
| 35.4 | 35.43 | 35.43 | 35.43 |
| 35.6 | 35.64 | 35.65 | 35.64 |
| 35.8 | 35.86 | 35.88 | 35.85 |
| 36.0 | 36.07 | 36.10 | 36.07 |

The circuit of Figure 3 with linear potentiometers and linearly marked dials may be used to correct for sample pressures over the range of 30 to 40 mm. Hg. In such a system, the potentiometer 25 has a value of 300,000 ohms and the optimum value for resistance 24 is 836,000 ohms. The results obtained in such tests are set out in Table II wherein P¹, P, D¹ and D have the same significance as in the preceding table.

*Table II*

| $P^1 = D^1$ | P | D Fig. 3 |
| --- | --- | --- |
| 30.0 | 29.72 | 29.68 |
| 31.0 | 30.77 | 30.74 |
| 32.0 | 31.82 | 31.81 |
| 33.0 | 32.88 | 32.87 |
| 34.0 | 33.94 | 33.94 |
| 35.0 | 35.00 | 35.00 |
| 36.0 | 36.07 | 36.06 |
| 37.0 | 37.14 | 37.13 |
| 38.0 | 38.21 | 38.19 |
| 39.0 | 39.29 | 39.26 |
| 40.0 | 40.37 | 40.32 |

This arrangement fully compensates for PV effects within the accuracy with which P¹ can be read.

In order to avoid any gross effect on the operating point of the input stage when the total feedback resistance is altered to compensate for the variables associated with the input to the amplifier, a negative voltage, equal and opposite to the voltage developed across the feedback network by the change in flow of plate current when the compensating adjustments are made, is applied across the feedback network. This is accomplished by altering a source of electrical potential (item 14 in Figures 1, 2, and 3) such that at 0 signal input the net D.C. potential developed across the feedback network is 0.

From the above, it will be apparent that we have provided a system for adjusting feedback to an amplifier system so as to compensate individually for (a) the drift of instrument components exterior of the amplifier; and (b) variations in physical conditions, such as temperature or pressure, within the test instrument.

In a preferred embodiment, the compensating means comprises a resistive network including an adjustable resistor means and an adjustable potentiometer means wired in parallel with respect to each other and to a common source of potential and, for example, to the input and output stages of such an amplifier system. The resistor means is adjustable to compensate for one such signal variable and the potentiometer means is adjustable to compensate for a second of such signal variables.

The pressure measuring device used may be of the type that produces an electrical signal as a result of sample pressure. One such system is described in U.S. Patent 2,567,253. This signal can be employed in conjunction with a servo system and a motor-driven potentiometer to provide automatic electrical adjustment of amplifier gain to compensate for the differences between actual sample pressure and a standard sample pressure. Whether the embodiments of Figure 2 or Figure 3 and whether a non-linear dial or potentiometer should be used will depend upon the characteristic behavior of the particular pressure-measuring device selected.

Although we have described our invention with respect to certain embodiments thereof, this is by way of example only and it should be understood that our invention is not limited thereto. Further, it is contemplated that modifications and revisions can be made by those skilled in the art in the illustrated embodiments without departing from the scope of the described invention.

What we claim is:

1. In an amplifier, of the direct current type employing degenerative feedback, which degenerative feedback is sufficiently high such that the gain of said amplifier is substantially inversely proportional to the amount of said degenerative feedback, a means of adjusting said degenerative feedback to individually compensate for two variables associated with the input of said amplifier comprising a resistive network consisting of two adjustable resistors wired in parallel, one of which is adjustable to compensate for one of said input variables, and the other is adjustable to compensate for the second of said input variables and means to apply an electrical potential across said feed back adjusting means whereby the net flow of current through said adjustable feedback means is essentially zero at zero signal input to said amplifier.

2. In a direct current amplifier having input and output tubes and employing degenerative feedback, which degenerative feedback is sufficiently high such that the gain of said amplifier is substantially inversely proportional to the amount of said degenerative feedback, a means of adjusting said degenerative feedback to individually compensate for two variables associated with the input of said direct current amplifier comprising a resistive network consisting of two adjustable resistors wired in parallel with respect to a common source of potential and the said input and output tubes, one of said variable resistors being a rheostat disposed between said common source of potential and the cathodes of said input and output tubes, and the other of the variable resistors being a voltage divider the terminals of which are connected to said common source of potential and the cathodes of said input and output tubes, and the other of the variable resistors being a voltage divider the terminals of which are connected to said common source of potential and the cathodes of said input and output tubes, the slide arm of said voltage divider being connected to the grid of said input tube and means to vary said common source of potential whereby the net flow of current through said adjustable feedback means is essentially zero at zero signal input to said amplifier.

3. In a mass spectrometer wherein a direct current amplifier is used to amplify a signal generated within the ionization chamber of said mass spectrometer, said direct current amplifier employing degenerative feedback, which degenerative feedback is sufficiently high such that the gain of the amplifier is substantially inversely proportional to the amount of said degenerative feedback, a means of adjusting said degenerative feedback to individually compensate for instrument sensitivity of said mass spectrometer and to compensate for variation of metered sample pressure comprising a resistive network consisting of two adjustable resistors wired in parallel, one of which is adjustable to compensate for one of said input variables, and the other is adjustable to compensate for the second of said input variables and means to apply an electrical potential across said feed back adjusting means whereby the net flow of current through said adjustable feedback means is essentially zero at zero signal input to said amplifier.

4. In a mass spectrometer system subject to variation of instrument sensitivity thereby causing a first variation in the output signal from the ion collector, and wherein variation in pressure of the metered sample causes a second variation in the output signal from the ion collector, the improvement which comprises a direct current amplifier stabilized by having a high degenerative feedback, which degenerative feedback is sufficiently high such that the gain of the amplifier is substantially inversely proportional to the amount of said degenerative feedback, compensating means for adjusting said degenerative feedback to individually compensate for such variation of instrument sensitivity and to compensate for variations of said metered sample pressure, said means comprising a resistive network including adjustable resistor means wired in parallel with respect to each other, one of said resistor means being adjustable to compensate for one of said operating variables and the other of which is adjustable to compensate for the second of said operating variables and means to apply an electrical potential across said feed back adjusting means whereby the net flow of current through said adjustable feedback means is essentially zero at zero signal input to said amplifier.

References Cited in the file of this patent

UNITED STATES PATENTS

| | | |
|---|---|---|
| 2,200,055 | Burnett | May 7, 1940 |
| 2,224,699 | Rust | Dec. 10, 1940 |
| 2,456,426 | Nier et al. | Dec. 14, 1948 |
| 2,734,949 | Berry | Feb. 14, 1956 |